US012752894B2

(12) United States Patent
Alves

(10) Patent No.: US 12,752,894 B2
(45) Date of Patent: Oct. 6, 2026

(54) KITE SYSTEM

(71) Applicant: SkySails Power GmbH, Hamburg (DE)

(72) Inventor: Benjamin Alves, Hannover (DE)

(73) Assignee: SkySails Power GmbH, Hamburg (DE)

( * ) Notice: Subject to any disclaimer, the term of this patent is extended or adjusted under 35 U.S.C. 154(b) by 213 days.

(21) Appl. No.: 18/841,915

(22) PCT Filed: Feb. 21, 2023

(86) PCT No.: PCT/EP2023/054289

§ 371 (c)(1),
(2) Date: Aug. 27, 2024

(87) PCT Pub. No.: WO2023/161215

PCT Pub. Date: Aug. 31, 2023

(65) Prior Publication Data

US 2025/0171124 A1 May 29, 2025

(30) Foreign Application Priority Data

Feb. 28, 2022 (EP) .................................... 22159174

(51) Int. Cl.
*B63H 9/069* (2020.01)
*F16G 15/04* (2006.01)

(52) U.S. Cl.
CPC ............. *B63H 9/069* (2020.02); *F16G 15/04* (2013.01)

(58) Field of Classification Search
CPC ................................ B63H 9/069; F16G 15/04
See application file for complete search history.

(56) References Cited

U.S. PATENT DOCUMENTS

2007/0157868 A1 7/2007 Wrage et al.

FOREIGN PATENT DOCUMENTS

| | | | | |
|---|---|---|---|---|
| DE | 102015111224 A1 * | 1/2017 | ............. | B63H 9/069 |
| EP | 4234390 A1 * | 8/2023 | ............. | F16G 15/04 |
| WO | WO-2005100150 A1 * | 10/2005 | ............. | B63H 9/069 |

OTHER PUBLICATIONS

PCT International Search Report and Written Opinion for International Application No. PCT/EP2023/054289 filed Feb. 21, 2023; Date of Mailing: Apr. 5, 2023; 11 pgs.

* cited by examiner

*Primary Examiner* — Marc Q Jimenez
*Assistant Examiner* — Jovon E Hayes
(74) *Attorney, Agent, or Firm* — Alix, Yale & Ristas, LLP

(57) ABSTRACT

The invention relates to a kite system comprising a kite (14), a line tree (24), a gondola (25), and a towing rope (15). The kite (14) is connected to the gondola (25) via the line tree (24), and the towing rope (15) extends between the gondola (25) and an attachment point (16, 55) installed in the ground. A pulling force which is exerted by the kite (14) during operation is transferred via a towing section (15, 24) which extends from the kite (14) to the attachment point (16, 55) via the line tree (24) and the towing rope (15). A separating device (40) which releases upon contacting water is arranged within the towing section (15, 24). The invention additionally relates to a separating device (40) which is suitable for a kite system.

13 Claims, 6 Drawing Sheets

KITE SYSTEM

BACKGROUND

The invention relates to a kite system comprising a kite, a line arrangement, a pod, and a tension rope. The kite is connected to the pod via the line arrangement. The tension rope extends between the pod and a terrestrial attachment point.

By suitable adjustment of the aerodynamic properties, the kite can be moved along flight paths which are aligned substantially perpendicularly to the tension rope. During the movement of the kite along the flight paths, a tensile force is exerted on the tension rope. The tensile force can be used to generate electric energy or as a propulsion force for a ship, for example.

Particularly when used on a ship or when used in the context of offshore power generation, a kite may accidentally land in the water. A tension rope stretched across the sea between an attachment point and a kite can represent a hazard for shipping. Hauling in and recovering a kite drifting in the water may be more difficult because the water may generate considerable forces in opposition to the kite when the latter is stretched open. Moreover, there may be damage to equipment if high forces are transmitted to the attachment point via the tension rope.

SUMMARY

It is the underlying object of the invention to present a kite system such that the hazards associated with a kite that accidentally lands in the water are mitigated. Proceeding from the cited prior art, the object is achieved by means of the features of the independent claim. Advantageous embodiments are specified in the dependent claims.

In the case of the kite system according to the invention, a tensile force exerted by the kite is transmitted via a tension strand, which extends from the kite to the attachment point via the line arrangement and the tension rope. A separating device, which is triggered upon contact with water, is arranged within the tension strand. The separating device is an element of the tension strand via which the tensile forces acting between the kite and the attachment point are transmitted in full or in part.

The invention is based on the concept of reducing the tensile forces emanating from a kite drifting in the water by parting, within the tension strand, a strand element participating in the transmission of the tensile forces. Landing the kite in the water is an event which is not envisaged in the normal operation of the kite system, for which reason it cannot be assumed that all the control mechanisms provided for the normal operation of the kite system will still be operational. With the invention, it is proposed to configure the separating device in such a way that it is triggered by contact with water. This ensures that the division of the connection within the tension strand still works reliably even if other control devices have failed.

An attachment point is terrestrial if it is not lifted off the earth by the tensile force of the kite. A terrestrial attachment point can be firmly connected to the ground. Terrestrial attachment points are also possible, for example, on a ship, on a floating pontoon or on a mobile system on land.

The tension strand extending between the kite and the attachment point can comprise a first section, in which the tensile force is transmitted via a plurality of mutually parallel strand elements. This section of the tension strand can correspond to the line arrangement extending between the kite and the pod. The separating device can be arranged within one of several mutually parallel strand elements. In this embodiment, there is still a connection between the kite and the attachment point via the remaining strand elements, even after the triggering of the separating device, via which connection the tensile forces can be transmitted.

The tension strand can branch between the separating device and the kite into a plurality of parallel strand elements, with the result that there are several points on the kite on which there is no longer any tensile force acting after the triggering of the separating device. It is also possible for the kite system to comprise a plurality of separating devices, which are arranged parallel to one another within the tension strand. In particular, it is possible to separate all the strand elements of the first section, such that there is no longer any connection to the second section of the tension strand.

The tension strand can comprise a second section, in which the entire tensile force is transmitted via a single strand element. The second section of the tension strand can correspond to the tension rope which extends between the pod and the attachment point. The separating device can be arranged within the second section of the tension strand, ensuring that the connection between the kite and the attachment point is fully interrupted with the triggering of the separating device.

A separating device arranged within the tension rope can have a position adjacent to the pod. In particular, the distance between the pod and the separating device can be less than 20%, preferably less than 10%, as a further preference less than 2%, of the length of the tension rope when the tension rope is fully paid out. After the triggering of such a separating device, the tension rope can be hauled in without much resistance. The kite must be recovered in a separate operation, e.g. by sailing a ship to the kite as it drifts freely in the water and hauling the kite on board the ship.

If, on the other hand, the tension strand is only partially parted with the triggering of the separating device, this opens up the possibility of hauling in the kite to the attachment point together with the tension rope. For this purpose, it is advantageous if the triggering of the separating device brings the kite into a state in which it can be pulled through the water without much drag.

In the normal operation of the kite system, the tension strand is configured in such a way that the kite covers a large area transversely to the direction of tension. This is achieved by attaching the line arrangement to the kite at a plurality of points which generate a large surface in a plane aligned perpendicularly to the direction of tension. The kite system can be configured in such a way that the points of the kite which are still attached to the tension strand generate a surface that is perpendicular to the direction of tension and that still corresponds to a maximum of 50%, preferably a maximum of 20%, as a further preference a maximum of 10%, of the surface generated in normal operation.

The kite can extend transversely to the direction of movement from a first edge section, via a central section, to a second edge section. The kite system can be configured in such a way that, when the separating device is triggered, the strand elements extending to the first edge section and the second edge section are parted. The tension strand is then only connected to the central section of the kite. The peripheral sections can give way rearward when the kite is pulled through the water.

Alternatively, the kite system can be configured in such a way that, after the triggering of the separating device, only one edge section of the kite is still connected to the tension strand, while the strand elements extending to the opposite edge section and the strand elements extending to a central section are parted. The edge section of the kite which is still connected to the tension strand can be a section that is peripheral in the transverse direction, a leading section in the longitudinal direction or a trailing section in the longitudinal direction. The longitudinal direction refers to the direction parallel to the direction of movement of the kite, that is to say generally a direction parallel to the airfoil profile of the kite.

The separating device can comprise a locking mechanism, which allows a change between a closed and an opened state of the separating device. In the closed state, a tensile force can be transmitted via the separating device arranged in the tension strand. In the opened state of the separating device, the tension strand is divided at this location.

The separating device can comprise a triggering element which reacts to contact with water. The triggering element can be in mechanical contact with the locking mechanism, ensuring that the separating device is held in the closed state until the triggering element comes into contact with water. For example, the triggering element can have a body consisting of a water-soluble material, such that the body is dissolved upon contact with water and thus opens up an actuation path for the locking mechanism. The body can be a cellulose pellet or a salt pellet, for example. The locking mechanism can be spring-loaded, ensuring that it changes automatically to the opened state after the opening up of the actuation path.

It is also possible for the triggering element to be configured as a triggering sensor which emits a control signal upon contact with water. The control signal can be transmitted to the locking mechanism via a cable or via a radio link. After the reception of the control signal, the locking mechanism can be actuated, such that the separating device changes from the closed state to the opened state. Also included are embodiments in which the locking mechanism is actuated in some other way, e.g. pneumatically or hydraulically.

The separating device can be configured in such a way that it can change between the opened and the closed state while bypassing the triggering element. In particular, the separating device can have a locking mechanism which can be actuated without triggering the triggering element. This enables the separating device to be used, for example, to establish or divide a connection between the line arrangement and the pod or between the pod and the tension rope. The triggering element can be retained unchanged, and can retain its function of triggering upon contact with water.

The actuating part can be spring-loaded in order to hold the separating device in the closed state. The spring force holding the actuating part can be selected in such a way that it can be overcome manually.

In one embodiment, the separating device is a shackle which opens automatically after the triggering of the triggering element. Also possible as an alternative are separating devices which are designed to part the tension strand or a part thereof by mechanical action, e.g. by cutting. In one embodiment, the separating device is a pyrocutter. Separating devices which act on a part of the tension strand by burning or exploding are also possible.

The triggering element can be configured in such a way that it reacts only upon contact with salt water but not upon contact with fresh water. This can be useful if the kite is being operated over the sea, such that crashing of the kite results in contact with salt water. In contrast, contact with rainwater would not lead to triggering of the triggering element.

In addition or as an alternative to this, the separating device can be configured in such a way that the triggering element is protected from rainwater. For example, the triggering element may be covered at the top or may be accessible from the outside only via a channel, ensuring that the triggering element is triggered only after immersion in water.

A separating device having one or more of the features mentioned has independent inventive content, even if it is not used in the context of a kite system according to the invention.

The kite system can also comprise the terrestrial attachment point to which the tension rope extends. The terrestrial attachment point can be a component part of an arrangement floating on the sea, such as, for example, of a floating pontoon or of a ship. The kite system can be an element of an apparatus for generating electric energy. The apparatus can comprise a generator driven via a tension rope winch. It is also possible for the kite system to be connected to an attachment point on a ship, making it possible to use the kite system to generate a propulsion force for the ship.

BRIEF DESCRIPTION OF THE DRAWINGS

The invention is described by way of example below by means of advantageous embodiments with reference to the attached drawings. In the drawings.

DETAILED DESCRIPTION

Figure 1:
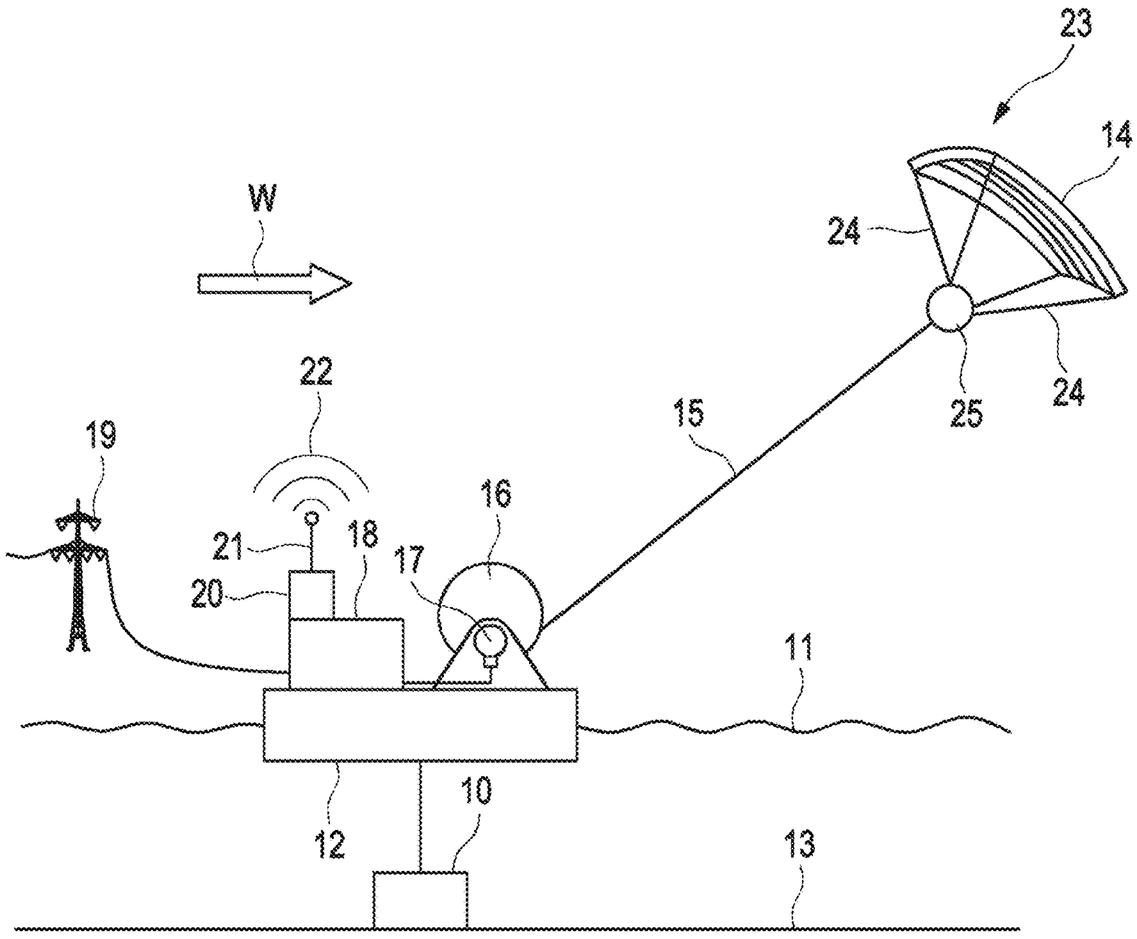
FIG. 1: shows an apparatus for generating electric energy comprising a kite system according to the invention.

An apparatus shown in FIG. 1 for generating electric energy comprises a kite system 23 according to the invention, which is connected to a tension rope winch 16 via a tension rope 15. The tension rope winch 16 forms an attachment point in the sense according to the invention. The kite system 23 comprises a kite 14, which is connected to a pod 25 via a line arrangement 24.

Coupled to the tension rope winch 16 is an electric power-generating/work-performing machine 17, which operates as a generator in a first operating state and as a motor in a second operating state. The power-generating/work-performing machine is connected to a public transmission network 19 via an electric power line 18, which comprises a frequency converter and a transformer, thus making it possible either to feed electric energy generated by means of the power-generating/work-performing machine 17 into the transmission network 19 or to operate the power-generating/work-performing machine 17 as a motor, using the electric energy taken from the transmission network 19. The apparatus comprises a control unit 20, which is designed to control the interaction between the components of the apparatus.

The tension rope winch 16 with the power-generating/work-performing machine 17 and the components of the electric power line 18 is arranged on a floating pontoon 12, which floats on the sea 11. The floating pontoon 12 is connected to an anchorage 10 situated on the seafloor 13.

The control unit 20 comprises an antenna 21, thus enabling control signals to be exchanged with the pod 25 via a radio link 22. In particular, the control unit 20 sends control signals to the pod 25 in order to control the flight path of the kite 14. Using the control signals, the length of control lines of the line arrangement 24 is changed, thereby influencing the direction of flight of the kite 14.

Figure 2:
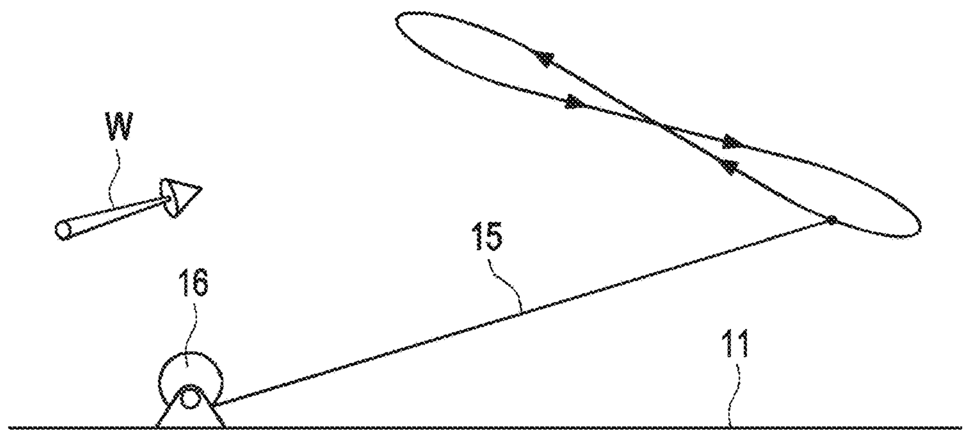
FIG. 2: shows a schematic illustration of an operating state of the apparatus from FIG. 1.

In the exemplary embodiment shown in FIG. 2, the kite 14 is being guided along a figure eight aligned substantially transversely to the wind direction W. While the kite 14 is following the flight path, a tensile force is exerted on the tension rope 15, driving the power-generating/work-performing machine 17 via the tension rope winch 16. By means of the power-generating/work-performing machine 17, which is operated as a generator in this operating state, the mechanical energy is converted into electric energy and fed into the public transmission network 19 via the power line 18. It is also possible to store some of the generated energy in electric form in an energy storage device in the power line 18. This enables electric energy to be generated until the length of the tension rope 15 is exhausted and the tension rope 15 has been paid out fully from the tension rope winch 16. The tension rope 15 is then hauled in by means of the power-generating/work-performing machine 17, which is operated as a motor, before electric energy can be generated again.

Figure 3:
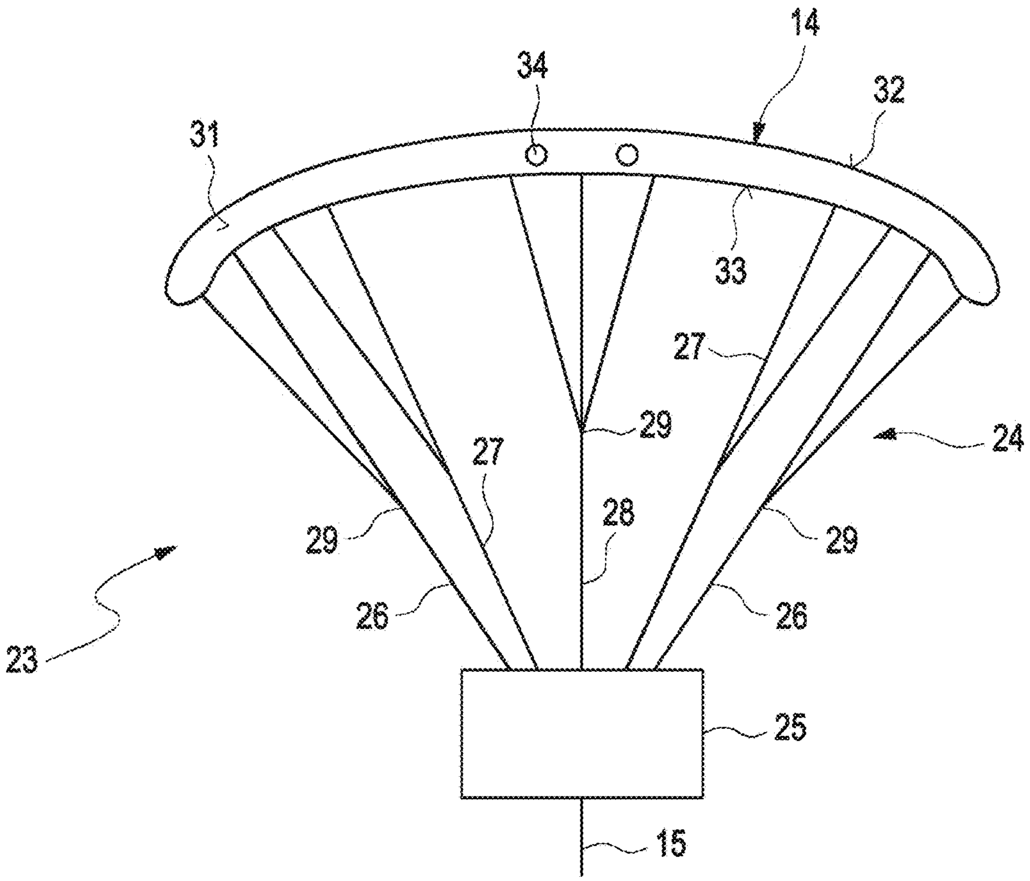
FIGS. 3-4: show details of the kite system from FIG. 1 in an enlarged illustration.
Figure 4:
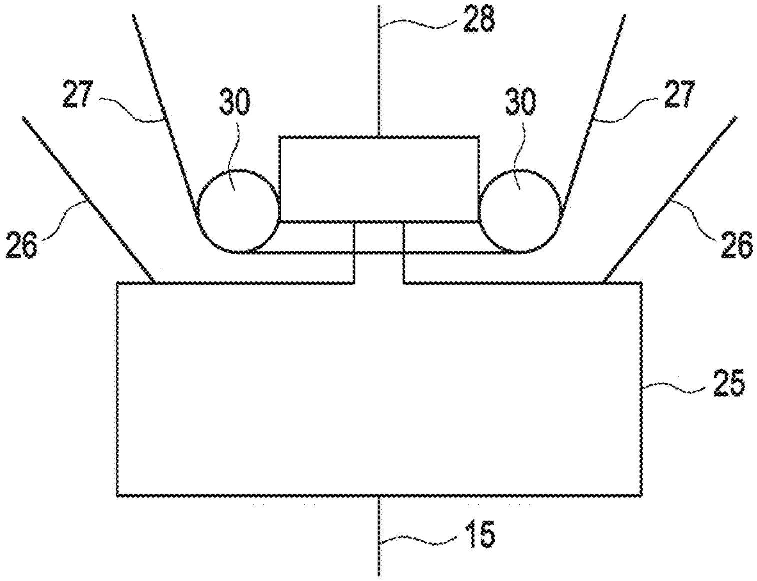

According to FIG. 3, the line arrangement 24 of the kite system 23 according to the invention comprises active control lines 26, passive control lines 27 and fixed lines 28, which are each attached to the pod 25 and which, starting from nodal points 29, branch into a plurality of ends attached to the kite 14. The fixed lines 28 extend from an end connected in a fixed manner to the pod 25 to a central section of the kite 14. The active control lines 26, the length of which is adjustable, extend from the pod 25 to two peripheral sections of the kite 14. The passive control lines 27, which are deflected via pulleys 30 at the pod 25, are secured on the kite 14 between the fixed lines 28 and the active control lines 26.

By adjusting the length of the active control lines 26, it is possible to control the direction of movement of the kite 14. As the active control lines 26 are adjusted, the passive control lines 27 are taken along via the pulleys 30, while the length of the passive control lines 27 from the kite 14, via the pulleys 30, and back to the kite 14 remains unchanged.

The kite 14 forms an airfoil profile which extends in the longitudinal direction from an end face 31 visible in FIG. 3, via an outer surface 32 and an inner surface 33, to a rear end, which is not visible in FIG. 3. A cavity is formed in the interior of the kite 14, said cavity being under overpressure during the normal operation of the kite system. The kite 14 comprises openings 34 formed in the end face 31, through which air can enter the interior and through which the overpressure is built up when the kite 14 is in motion.

Figure 5:
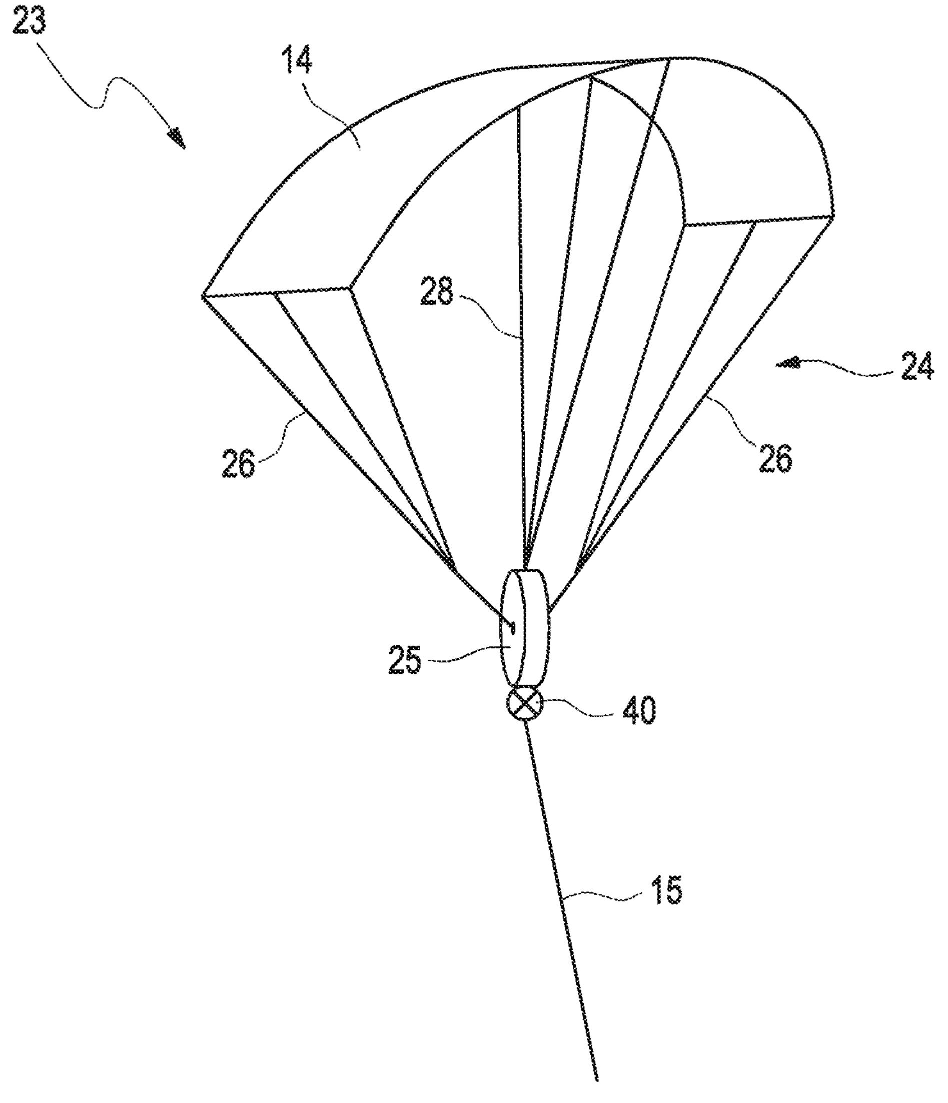
FIG. 5: shows a kite system according to the invention.

According to FIG. 5, the pod 25 is connected to the tension rope 15 via a separating device 40. The separating device 40 is triggered upon contact with water 40 and divides the connection between the pod 25 and the tension rope 15. If the kite 14 falls into the sea 11 on account of an unusual operating situation, the separating device 40 comes into contact with the seawater, and the connection between the pod 25 and the tension rope 15 is released. The tension rope 15 can be hauled in by means of the tension rope winch 16 without having to apply relatively large forces. This has the advantage that a hazard for shipping that may result from the tension rope 15 being stretched between the tension rope winch 16 and the pod 25 can be rapidly removed. After the triggering of the separating device 40, the kite 14 and the pod 15 drift freely on the sea and can be recovered by means of a ship.

Figure 10:
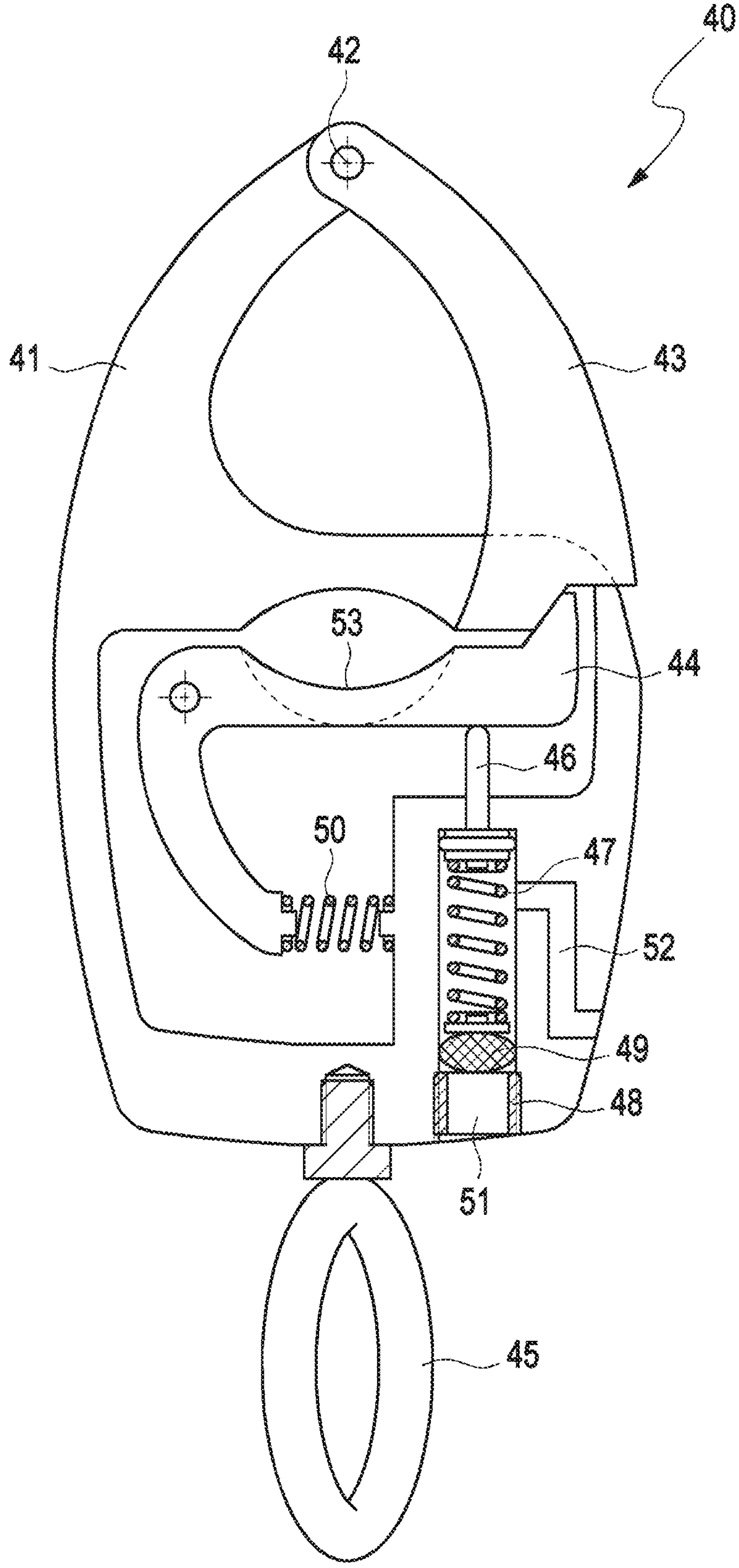
FIG. 10: shows an embodiment of a separating device of a kite system according to the invention.

FIG. 10 shows an embodiment of a separating device 40 according to the invention in the form of a shackle. The shackle comprises a shackle body 41 designed as a casting. The closure piece 43 is connected to a front end of the shackle body 41 via an articulated connection 42, said closure piece being held in the closed position shown in FIG. 10 by means of a latch 44. An eye 45 is screwed into the shackle body 41 at the opposite, rear, end of the shackle. During the operation of the kite system 23 shown in FIG. 5, the tension rope 15 is connected to the eye 45, and the front end of the shackle is attached to the pod 25.

The shackle comprises a retention element 46, by means of which the latch 44 is held in the closed state. The retention element 46 is arranged in a hole in the shackle body 41 and is held by a retention spring 47 in the forward state shown in FIG. 10. The hole is closed by means of a plug 48. The retention spring 47 is supported via a cellulose pellet 49 on the front end of the plug 48.

If the shackle falls into the sea 11, the cellulose pellet 49 comes into contact with seawater and dissolves. The retention element 46 is no longer supported on the plug 48 and therefore opens up a space for the movement of the latch 44. The latch 44 is released by the force of a latch spring 50, which is under stress in the normal state. The closure piece 43 opens and the pod 25 is separated from the tension rope 15.

The space in which the cellulose pellet 49 is arranged is connected to the environment by a first channel 51 formed in the plug 48 and by a second channel 52 formed in the closure body 41. The seawater can enter through one of the channels, while the air can escape through the other channel. Trapping of air bubbles is avoided. The channels 51, 52 are configured and aligned in such a way that no rainwater can get to the cellulose pellet 49 during the normal operation of the kite system 23. Only after the shackle is immersed in water does the cellulose pellet 49 dissolve.

It is also possible for the shackle to be opened without the cellulose pellet 49 being dissolved if an operator exerts pressure on the latch 44 via a gripping surface 53. The retention spring 47 is dimensioned in such a way that it can be compressed by manual force.

Figure 6:
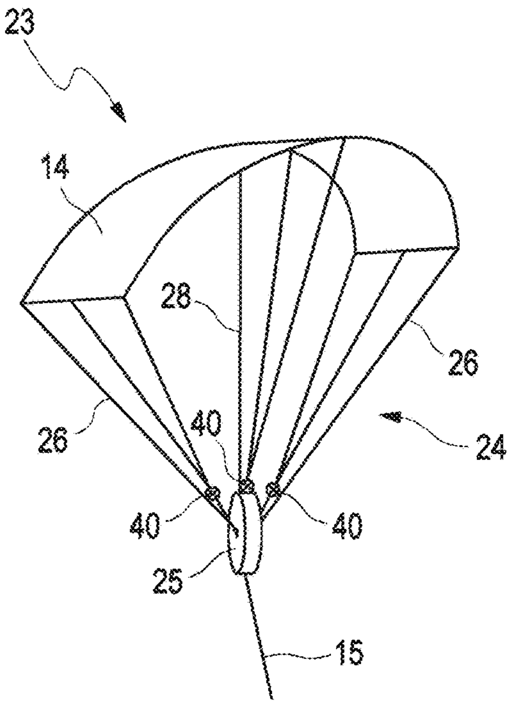
FIG. 6: shows an alternative embodiment of a kite system according to the invention.
Figure 7:
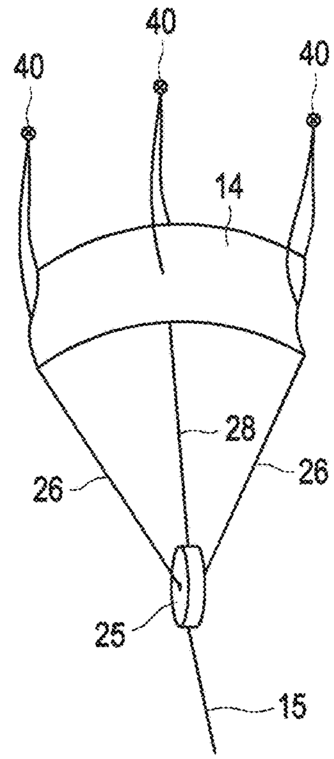
FIG. 7: shows the kite system from FIG. 6 in another state.

In FIG. 6, the line arrangement 24, which is illustrated in a simplified manner, has three fixed lines 28, which extend to a central section of the kite 14, and in each case three control lines 26, which extend to opposite edge sections of the kite 14. The kite system comprises a total of three separating devices 40, wherein two of the three fixed lines 28 are attached to the pod 25 via the first separating device 40, and wherein two of the three control lines 26 are attached to the pod via the second and the third separating device 40, respectively. If the kite 14 falls into the sea 11, the three separating devices 40 are triggered, with the result that only one of the fixed lines 28 and in each case only one of the control lines 26 is still connected to the pod 25. The connection is with a leading section of the airfoil profile of the kite 14, while the trailing part of the kite 14 can pivot out rearward. In this state, the kite 14 forms a flat structure which can be hauled in by means of the tension rope 15 without having to exert high forces, see FIG. 7.

Figure 8:
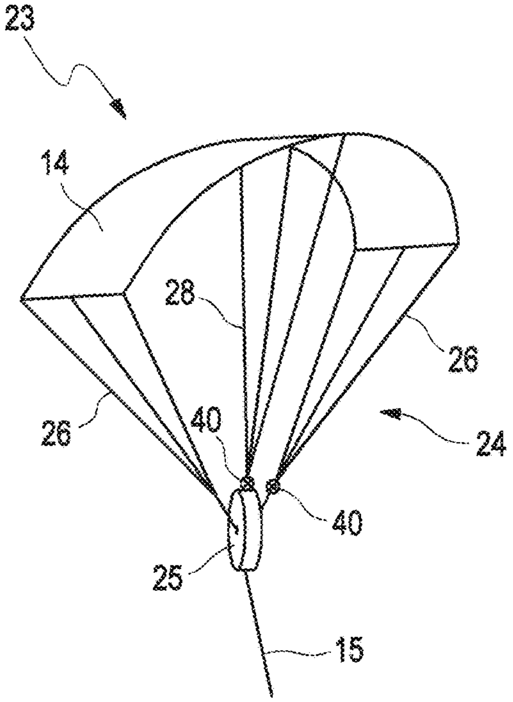
FIG. 8: shows another embodiment of a kite system according to the invention.
Figure 9:
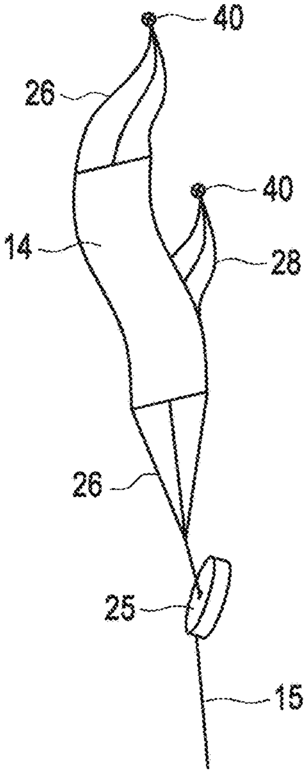
FIG. 9: shows the kite system from FIG. 8 in another state.

FIGS. 8 and 9 show an alternative embodiment, in which two separating devices 40 are arranged in the line arrangement 24, which is illustrated in a simplified manner. The first separating device 40 separates all three fixed lines 28 from the pod 25. The second separating device separates the set of control lines 26 which is arranged on one side of the fixed lines 28 completely from the pod, and therefore the kite 14 is connected to the pod 25 only via the other set of control lines 26. After the triggering of the separating devices 40, a flat structure is likewise formed, and this can be pulled through the water without a large expenditure of force and can be hauled in by means of the tension rope 15, see FIG. 9.

Figure 11:
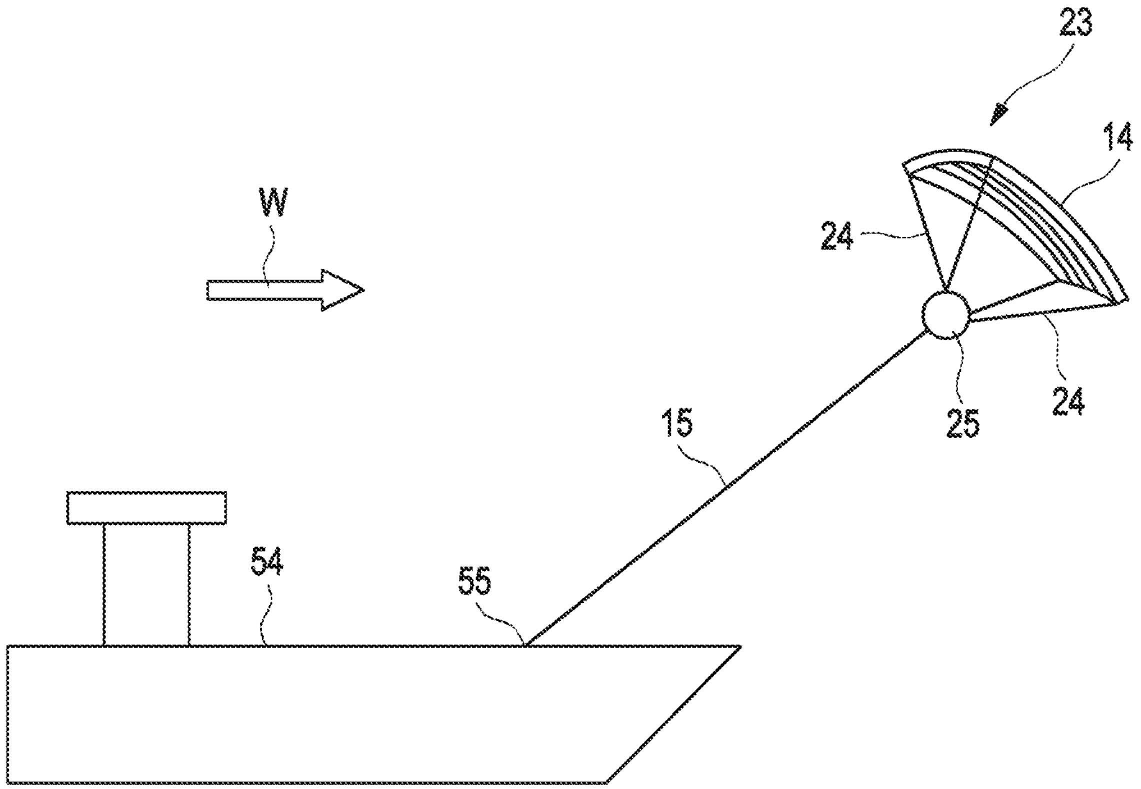
FIG. 11: shows a ship having a kite system according to the invention.

FIG. 11 shows an alternative embodiment of the invention, in which the kite system 23 according to the invention is used to generate a propulsion force for a ship 54. The tension rope 15 is attached to an attachment point 55 on the ship 54.

The invention claimed is:

1. A kite system comprising a kite (14), a line arrangement (24), a pod (25), and a tension rope (15), wherein the kite (14) is connected to the pod (25) via the line arrangement (24), and wherein the tension rope (15) extends between the pod (25) and a terrestrial attachment point (16, 55), and wherein a tensile force exerted by the kite (14) during operation is transferred via a tension strand (15, 24), which extends from the kite (14) to the attachment point (16, 55) via the line arrangement (24) and the tension rope (15), wherein a separating device (40), which is triggered upon contact with water, is arranged within the tension strand (15, 24).

2. The kite system of claim 1, wherein the tension strand (15, 24) is fully parted when the separating device (40) is triggered.

3. The kite system of claim 1, wherein the tension strand (15, 24) comprises a section in which the tensile force is transmitted via a plurality of mutually parallel strand elements (26, 27, 28).

4. The kite system of claim 3, wherein the separating device (40) is arranged within one of several mutually parallel strand elements (26, 27, 28).

5. The kite system of claim 3, comprising a plurality of separating devices (40), which are arranged parallel to one another within the tension strand (15, 24).

6. The kite system of claim 3, wherein, the tension strand (15, 24) is partially parted when the separating device (40) is triggered.

7. The kite system of claim 6, wherein points of the kite (14) which are attached to the tension strand after the triggering of the separating device (40) generate a surface that is perpendicular to the direction of tension and that still corresponds to a maximum of 50% of the surface generated in normal operation.

8. The kite system of claim 1, wherein the tension strand (15, 24) comprises a section in which the entire tensile force is transmitted via a single strand element (15), and in that the separating device (40) is arranged within the single strand element (15).

9. The kite system of claim 1, wherein the separating device (40) comprises a triggering element (49) which is dissolved upon contact with water.

10. The kite system of claim 9, wherein the triggering element (49) is triggered only upon contact with salt water.

11. The kite system of claim 9, wherein the triggering element (49) is protected from contact with rainwater.

12. The kite system of claim 9, wherein the triggering element (49) is in mechanical contact with a locking mechanism (44) of the separating device (40).

13. The kite system of claim 9, wherein the separating device (40) has a locking mechanism which can be actuated without triggering the triggering element (49).

* * * * *